(12) United States Patent
Washbourne et al.

(10) Patent No.: US 6,778,907 B1
(45) Date of Patent: Aug. 17, 2004

(54) METHOD FOR ESTIMATION OF PROPAGATION PATHS FOR SEISMIC SIGNALS

(75) Inventors: John K. Washbourne, Houston, TX (US); Kenneth P. Bube, Seattle, WA (US)

(73) Assignee: Core Laboratories LP, Houston, TX (US)

( * ) Notice: Subject to any disclaimer, the term of this patent is extended or adjusted under 35 U.S.C. 154(b) by 212 days.

(21) Appl. No.: 09/614,414

(22) Filed: Jul. 12, 2000

(51) Int. Cl.[7] ............................................. G06F 19/00
(52) U.S. Cl. ................................................. 702/6; 703/5
(58) Field of Search .............................. 702/6, 14, 16, 702/18; 703/5; 367/73

(56) References Cited

U.S. PATENT DOCUMENTS

| | | | |
|---|---|---|---|
| 5,062,086 A | 10/1991 | Harlan et al. | |
| 5,481,501 A | 1/1996 | Blakeslee et al. | |
| 5,596,548 A | 1/1997 | Krebs | |
| 5,696,735 A | 12/1997 | Krebs | |
| 5,999,489 A | 12/1999 | Lazaratos | |
| 6,002,642 A | 12/1999 | Krebs | |
| 6,014,342 A | 1/2000 | Lazaratos | |
| 6,035,256 A | * 3/2000 | Stankovic | 702/14 |
| 6,067,340 A | 5/2000 | Eppstein et al. | |
| 6,112,155 A | * 8/2000 | Pham | 702/14 |
| 6,269,310 B1 | 7/2001 | Washbourne | 702/17 |
| 6,388,947 B1 | * 5/2002 | Washbourne et al. | 367/73 |

OTHER PUBLICATIONS

Jean Luc Guiziou, Jean Laurent Mallet, and Raul Madariaga; "3–D seismic reflection tomography on top of the GOCAD depth modeler"; Geophysics; Sep.–Oct. 1996; p. 1499–1510; vol. 61; No. 5.

Keith A. Meyerholtz, Gary L. Pavlis and Sally A. Szpakowski; "Convolutional quelling in seismic tomography"; Geophysics; May 1989; p. 570–580; vol. 54; No. 5.

Kris A. Dines and R. Jeffrey Lytle; "Computerized Geophysical Tomography"; Proceedings of the IEEE; Jul. 1979; p. 1065–1073; vol. 67; No. 7.

John A. Scales; "Tomographic inversion via the conjugate gradient method"; Geophysics; Feb. 1987; p. 179–185; vol. 52; No. 2.

(List continued on next page.)

*Primary Examiner*—John Barlow
*Assistant Examiner*—Victor J. Taylor
(74) *Attorney, Agent, or Firm*—E. Thigpen

(57) ABSTRACT

In one embodiment, the invention includes a method for estimating seismic signal propagation raypaths from seismic source locations through a subsurface formation to seismic receiver locations. Raypaths are determined which minimize the value of an expression which is a function of travel time and distance between a source location and a receiver location. The value of the expression depends on the value of a parameter which balances the weighting of travel time and distance in the expression.

10 Claims, 9 Drawing Sheets

OTHER PUBLICATIONS

Spyros K. Lazaratos and Bruce P. Marion; "Crosswell seismic imaging of reservoir changes caused by $CO_2$ injection"; The Leading Edge; Sep. 1997; p. 1300–1306; vol. 16; No. 9.

Stephen K. L. Chiu and Robert R. Stewart; "Tomographic determination of three dimensional seismic velocity structure using well logs, vertical seismic profiles, and surface seismic data"; Geophysics; Aug. 1987; p. 1085–1098; vol. 52; No. 8.

W. Scott Phillips and Michael C. Fehler; "Traveltime tomography: A comparison of popular methods"; Geophysics; Oct.; p. 1639–1649; vol. 56; No. 10.

John A. Scales, Paul Docherty and Adam Gersztenkorn; "Regularisation of nonlinear inverse problems: imaging the near–surface weathering layer"; Inverse Problems 6; p. 115–131; 1990; vol. 6.

Adam Gersztenkorn and John A. Scales; "smoothing seismic tomograms with alpha–trimmed means"; Geophysical Journal; Jan. 1988; p. 67–72; vol. 92; No. 1.

Don W. Vasco, John E. Peterson, Jr., and Ernest L. Majer; "Beyond ray tomography: Wavepaths and Fresnel volumes"; Geophysics; Nov.–Dec. 1995; p. 1790–1804; vol. 60; No. 6.

Vlastislav cerveny and Jose Eduardo P. Soares; "Fresnel volume ray tracing"; Geophysics; Jul. 1992; p. 902–915; vol. 57; No. 7.

Marta Jo Woodward; "Wave–equation tomography"; Geophysics; Jan. 1992; p. 15–26; vol. 57; No. 1.

Dave E. Nichols; "Maximum energy traveltimes calculated in the seismic frequency band"; Geophysics; Jan.–Feb. 1996; p. 253–263; vol. 61; No. 1.

Samuel H. Gray and William P. May; "Kirchhoff migration using eikonal equation traveltimes"; Geophyics; May 1994; p. 810–817; vol. 59; No. 5.

Sebastien Geoltrain and Jean Brac; "Can we image complex structures with first–arrival travetime?"; Geophysics; Apr. 1993; p. 564–575; vol. 58; No. 4.

* cited by examiner

PRIOR ART

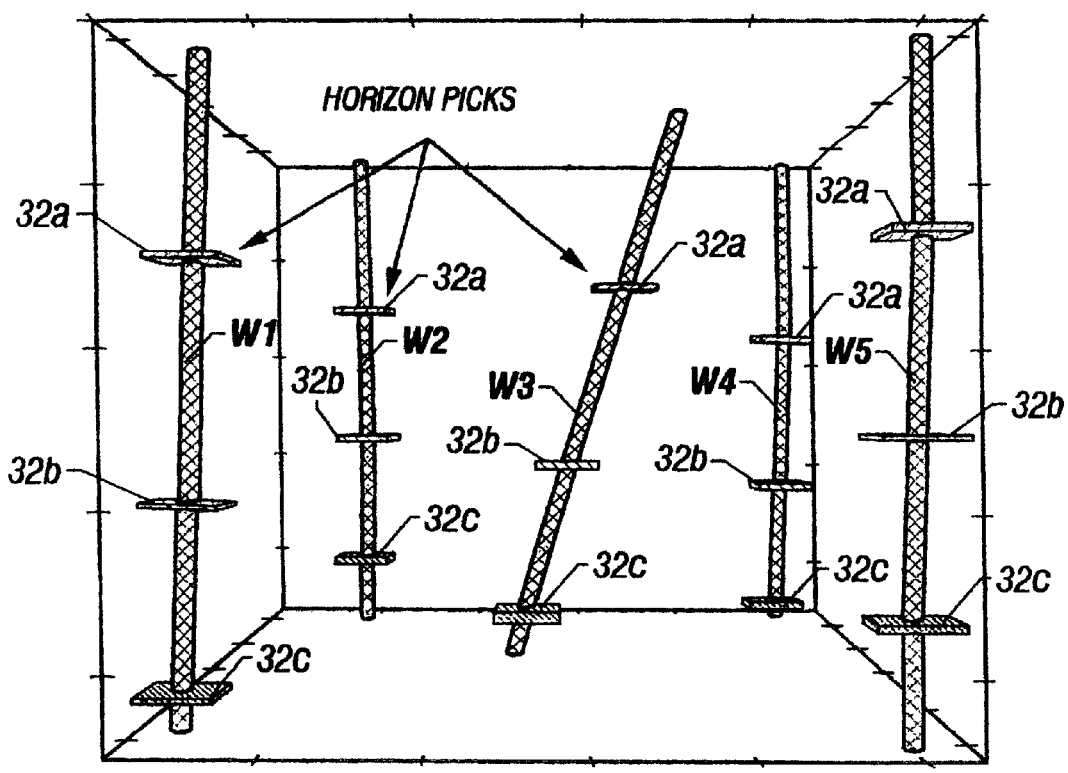
PRIOR ART  FIG. 3
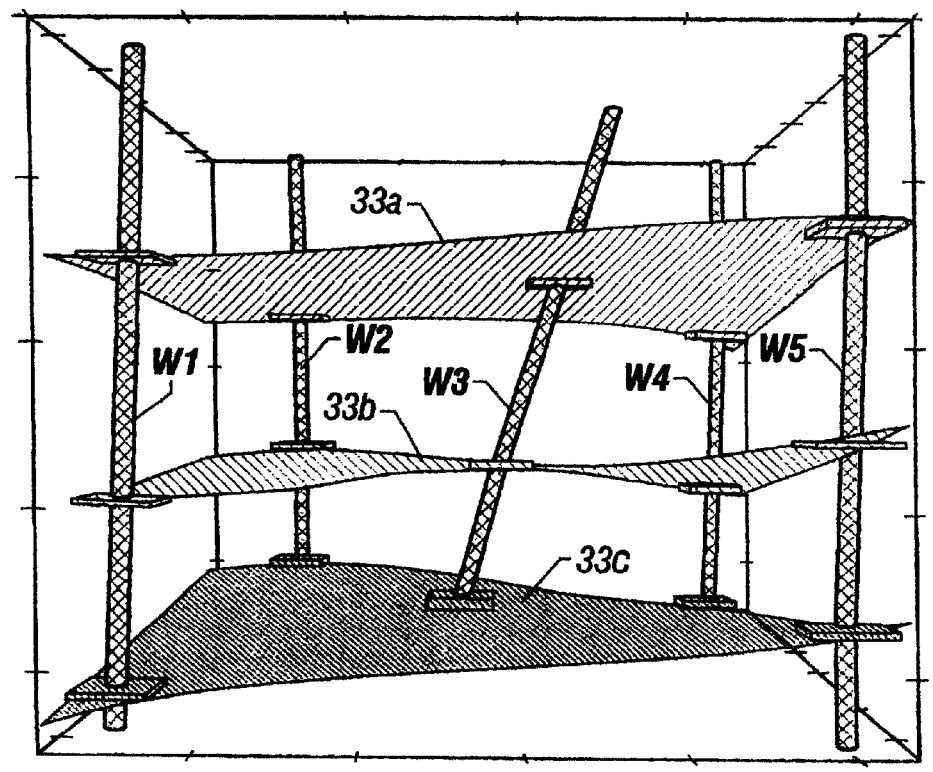
PRIOR ART  FIG. 4

PRIOR ART

PRIOR ART

|  | $x_{i-1}$ | $y_{i-1}$ | $x_i$ | $y_i$ | $x_{i+1}$ | $y_{i+1}$ |
|---|---|---|---|---|---|---|
| $x_{i-1}$ | $\dfrac{\partial^2 T}{\partial x_{i-1}\partial x_{i-1}}$ |  |  |  |  |  |
| $y_{i-1}$ | $\dfrac{\partial^2 T}{\partial y_{i-1}\partial x_{i-1}}$ | $\dfrac{\partial^2 T}{\partial y_{i-1}\partial y_{i-1}}$ |  |  |  |  |
| $x_i$ | $\dfrac{\partial^2 T}{\partial x_i\partial x_{i-1}}$ | $\dfrac{\partial^2 T}{\partial x_i\partial y_{i-1}}$ | $\dfrac{\partial^2 T}{\partial x_i\partial x_i}$ |  |  |  |
| $y_i$ | $\dfrac{\partial^2 T}{\partial y_i\partial x_{i-1}}$ | $\dfrac{\partial^2 T}{\partial y_i\partial y_{i-1}}$ | $\dfrac{\partial^2 T}{\partial y_i\partial x_i}$ | $\dfrac{\partial^2 T}{\partial y_i\partial y_i}$ |  |  |
| $x_{i+1}$ |  |  | $\dfrac{\partial^2 T}{\partial x_{i+1}\partial x_i}$ | $\dfrac{\partial^2 T}{\partial x_{i+1}\partial y_i}$ | $\dfrac{\partial^2 T}{\partial x_{i+1}\partial x_{i+1}}$ |  |
| $y_{i+1}$ |  |  | $\dfrac{\partial^2 T}{\partial y_{i+1}\partial x_i}$ | $\dfrac{\partial^2 T}{\partial y_{i+1}\partial y_i}$ | $\dfrac{\partial^2 T}{\partial y_{i+1}\partial x_{i+1}}$ | $\dfrac{\partial^2 T}{\partial y_{i+1}\partial y_{i+1}}$ |

FIG. 8

METHOD FOR ESTIMATION OF PROPAGATION PATHS FOR SEISMIC SIGNALS

BACKGROUND OF THE INVENTION

1. Field of the Invention

This invention relates generally to the field of geophysics and more particularly to a method for estimating the travel path of a seismic signal through the earth's subsurface.

2. Description of Related Art

Knowledge of the subsurface structure of the earth is useful for finding and extracting mineral resources such as oil and natural gas. Geophysical techniques which have been utilized for obtaining knowledge of the subsurface include surface seismic exploration, vertical seismic profiling and crosswell seismic tomography.

Surface seismic exploration produces data which cover a large volume of the earth's subsurface, however, data resolution is low. The maximum utilizable seismic frequencies are several hundred Hz., and the resulting spatial resolution is correspondingly limited. Crosswell seismic imaging provides data for the earth's subsurface extending between well locations, and it provides this data at a higher resolution than is provided by surface seismic data. Vertical seismic profiling typically employs a seismic source at the earth's surface and seismic receivers in a borehole. However, "reverse" vertical seismic profiling employs a source in the borehole and receivers on the surface. Typically, data resolution provided by vertical seismic profiling is also better than for surface seismic operations.

Conventional crosswell seismic imaging typically utilizes a pair of boreholes in proximity to a reservoir of interest. In the first of these boreholes, a seismic source is deployed for emitting seismic energy into the region of interest, often as a swept frequency signal extending through a selected frequency range. The source is sequentially moved through a series of positions within the first borehole and a seismic signal is generated at each position. The seismic energy passes through the subterranean formation of interest to the second one of the pair of boreholes. A receiver array is typically deployed within the second borehole and, like the seismic source, the receiver array is moved through a series of positions within the second borehole. By transmitting a signal from each source position in the first borehole and receiving data from each source position at each receiver position in the second borehole, a seismic crosswell data set is generated. Surveys may also be conducted across a region penetrated by a plurality of boreholes by deploying a source in one of the boreholes and deploying receivers in each of a plurality of boreholes so as to simultaneously record a plurality of data sets.

The data records from a typical crosswell survey represent a very large body of information. For example, if data are obtained from three hundred different receiver positions and each receiver position receives data from each of three hundred source positions, the result will be ninety thousand separate data records or "traces". Crosswell imaging contemplates the use of this data to produce a map representing a seismic parameter, such as velocity, of the subsurface structure in the vicinity of the boreholes.

In general, the subsurface structure is mathematically modeled and this model is used as a basis for forming a tomographic image of a seismic parameter of interest, such as velocity. In one model which is typically used, the vertical plane extending between two boreholes is divided into square pixels and the region within a pixel is assumed to be homogeneous with regard to seismic properties such as wave propagation velocity. A system of equations is set up, based on the travel times and travel paths of the crosswell signals between source and receiver locations. This system of equations is then solved to determine the velocity profile within the subsurface structure between the boreholes.

Another method utilizes geological formation boundaries, such as formation tops, which have been identified from well logging data, or other data, as a basis for forming the model, which may be a three dimensional model. Data representing the identified formation tops are applied to 2-D Chebyshev polynomials, and subterranean surfaces are then defined which approximate the interfaces between subsurface strata of differing lithology. Additional surfaces, extending laterally between the surfaces calculated from the formation tops, are then added to the model. A seismic property of interest, such as velocity, of the subsurface region between the surfaces is then modeled with another Chebyshev polynomial in each layer. A system of equations is then set up, based on the travel times and travel paths of the crosswell signals between source and receiver locations. This system of equations is solved to determine the velocity profile within the subsurface structure between the boreholes in a manner which is substantially analogous to the method utilized with the pixel based model.

Regardless of whether the data is surface seismic data, crosswell seismic data or vertical seismic profiling data, an estimation of the travel time and the travel path from source to receiver locations is required for processing the data. Prior art techniques have included the shooting method and the ray bending method. It is an object of this invention to provide an improved method for estimating such travel times and travel paths.

SUMMARY OF THE INVENTION

In one embodiment, the invention includes a method for estimating seismic signal propagation raypaths from seismic source locations through a subsurface formation to seismic receiver locations. Raypaths are determined which minimize the value of an expression which is a function of travel time and distance between a source location and a receiver location. The value of the expression depends on the value of a parameter which balances the weighting of travel time and distance in the expression.

In another embodiment, the invention includes a method for estimating the travel path of a seismic signal from a seismic source location through a subsurface formation to a seismic receiver location, in which a value for a parameter is determined and a travel path is estimated which minimizes the value of a mathematical expression comprising a function of said parameter, travel time and distance. The parameter balances the weighting of travel time and distance in the expression. The value of the parameter is determined so that the estimated travel path for the seismic signal has a travel time substantially equal to $T_{Snell}+1/(2f)$ when the value of the expression is minimized, where:

$T_{Snell}$=the Snell's Law raypath travel time from said source location to said receiver location; and f=the dominant frequency in said seismic signal.

BRIEF DESCRIPTION OF THE DRAWINGS

The present invention may be understood by reference to the following detailed description taken in conjunction with the drawings briefly described below.

FIG. 3 shows the identification of formation tops from well log data.

FIG. 4 shows construction of subsurface horizons based on identified formation tops.

FIG. 8 shows the form of the Hessian matrix.

While the invention will be described in connection with its preferred embodiments, it will be understood that the invention is not limited thereto, but shall include all alternatives, modifications, and equivalents within the scope of the appended claims.

DESCRIPTION OF THE PREFERRED EMBODIMENT

Figure 1:
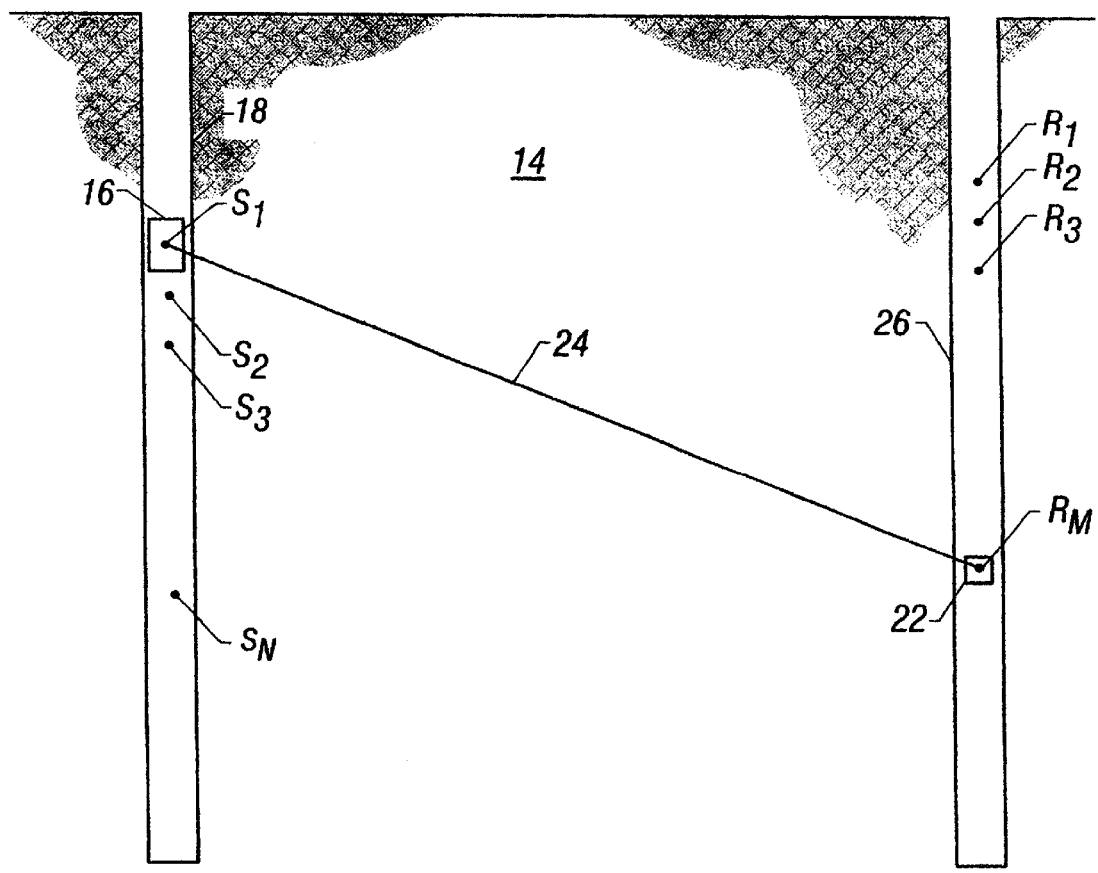
FIG. 1 shows a schematic view of a configuration for gathering crosswell imaging data.

A preferred embodiment of the invention will be described with reference to crosswell imaging. Although the preferred embodiment is described with reference to signals generated in a first borehole and detected by receivers in a second borehole, those of ordinary skill in the art will recognize that the invention may be practiced by generating and detecting seismic signals with sources and receivers which are in the same borehole. Those of ordinary skill in the art will recognize, also, that the method of estimating propagation paths described herein is equally applicable in any process which requires estimation of travel paths and travel time of seismic energy. FIG. 1 shows a configuration for gathering crosswell imaging data. Seismic energy is transmitted from source 16 positioned within a first borehole 18, through a subsurface region 14, and is detected by a receiver array 22 positioned in a second borehole 26. Source 16 is moved between a series of positions extending from $S_1$ to $S_N$ and receiver array 22 is moved between receiver positions $R_1$ and $R_M$. Receiver array 22 may be made up of a plurality of receivers such that the receivers are capable of detecting the seismic signal emanated from a source position simultaneously at a plurality of receiver locations. For illustration purposes, only transmission path 24 of the signal transmission detected at receiver position $R_M$ and transmitted from source location $S_1$ is shown. It is understood, however, that in a typical crosswell imaging survey, the signal may be transmitted from hundreds of source positions extending from $S_1$ to $S_N$ and each transmission may be detected at hundreds of receiver positions. It is understood, also, that more than two boreholes may be available, and that crosswell seismic data may be recorded from a plurality of pairs of boreholes. The travel times of the seismic signal between each source and receiver location are determined by noting the location of the first arrival in the recorded data traces. Systems for transmitting and receiving seismic signals between boreholes are well known and will not be discussed herein.

The recorded data are used to produce a tomographic map that represents a property of the subsurface structure through which the seismic signals travel from the source locations to the receiver locations. Typically, the property of interest is seismic velocity or slowness, which is the reciprocal of velocity. In order to produce this map, the subsurface structure of interest is mathematically modeled in such a way that the crosswell seismic data record can be applied to the model.

Figure 2:
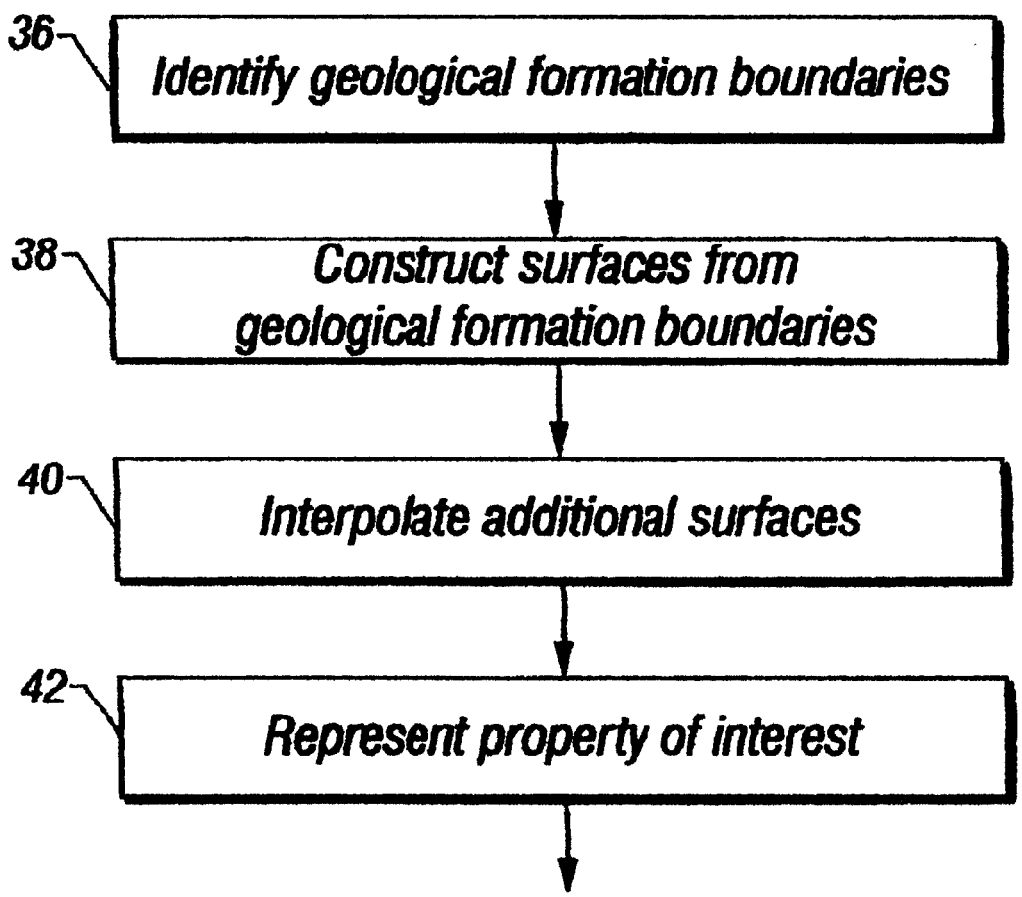
FIG. 2 shows the steps for developing a model of the subsurface which is useful in implementing the invention.

FIG. 2 shows steps for developing a model of the subsurface which is useful in implementing the invention. The initial step 36 of FIG. 2, in a preferred embodiment, is the identification of geological formation boundaries, such as formation tops. In a preferred embodiment of the invention, well log data, or other a priori data, are utilized to identify, in a known manner, formation strata boundaries known in the art as "formation tops". Well logs may be produced from various data, including well log data, data from drilling cuttings, core sampling data, vertical seismic profiling data and measurement while drilling (MWD) data. Other data, such as surface seismic, or crosswell seismic data, may also be utilized in identifying geological formation boundaries. In the example shown in FIG. 3, three formation tops 32a, 32b and 32c have been identified for each of five wells, W1, W2, W3, W4 and W5. Following identification of the formation tops, the model is further constructed in step 38 of FIG. 2 by mathematically constructing formation strata boundaries which extend between the identified formation tops. These strata boundaries will be referred to herein as "horizons" or "surfaces". In one embodiment of the invention, a continuous analytic function such as a Chebyshev polynomial in the following form is utilized to mathematically define each identified horizon, in which z is determined as a function of x and y for each of the horizons:

$$z=F(x,y)=C_0+C_1x+C_2y+C_3xy+C_4(2x^2-1)+C_5(2y^2-1)+C_6(2x^2-1)y+$$
$$C_7(2y^2-1)x+C_8(4x^3-3x)+C_9(4y^3-3y) \quad\quad\quad (Eq.\ 1)$$

where $C_0$ through $C_9$ are the Chebyshev coefficients describing a two dimensional surface with cubic structure. Lanczos Decomposition (singular value decomposition) may be used to invert the data defining the identified formation tops to establish the coefficients of these polynomials. However, other suitable techniques, known to those of ordinary skill in the art, may be employed to determine the values of these coefficients. FIG. 4 illustrates the three surfaces, 33a, 33b and 33c, constructed based on the identified formation tops 32a, 32b and 32c.

Figure 5:
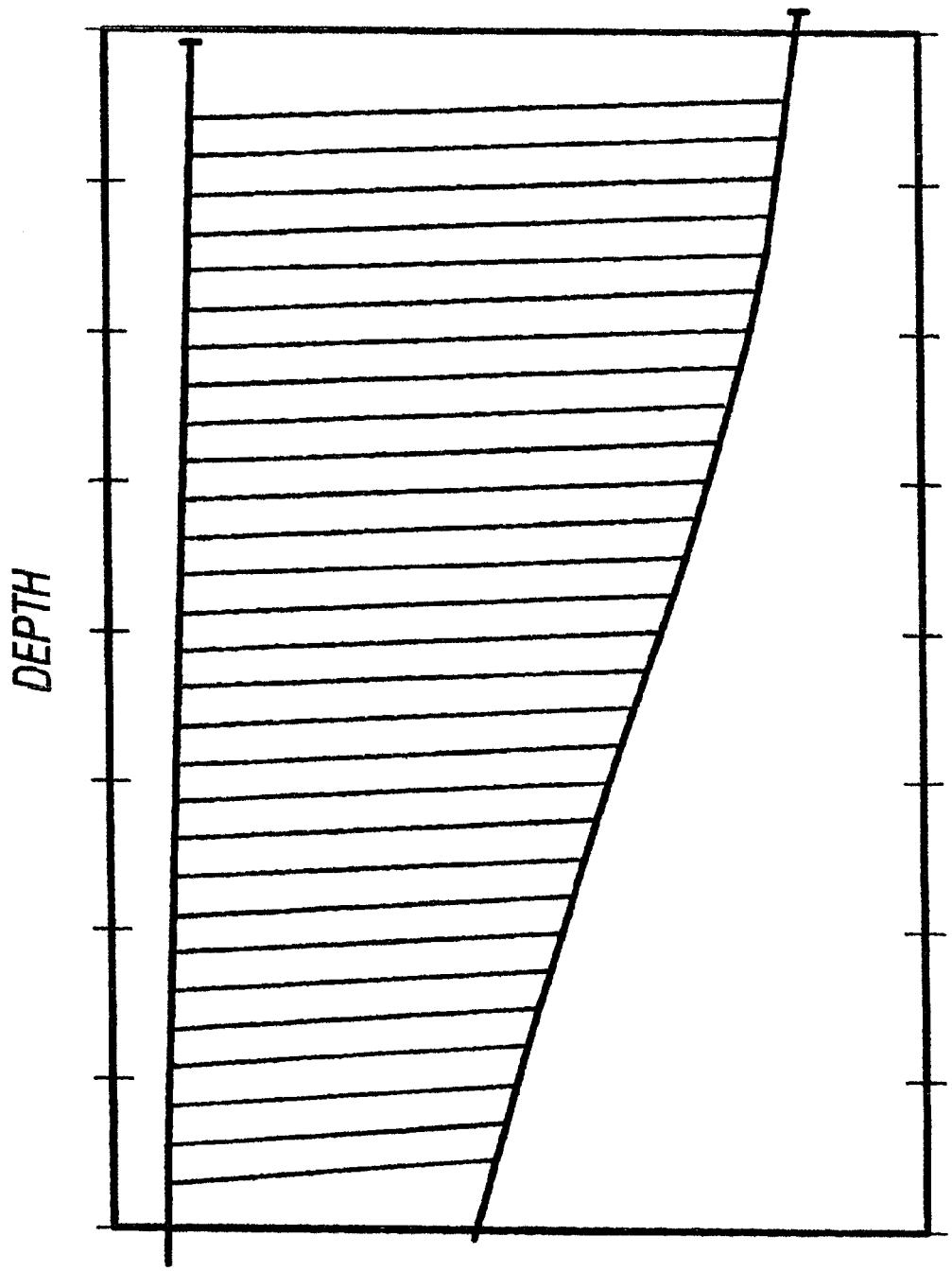
FIG. 5 shows additional interpolated surfaces positioned between horizons developed from identified formation tops.

In constructing this model, in step 40 of FIG. 2, additional surfaces are then interpolated between the surfaces which are constructed from the formation tops identified from well logs. Spacing between the surfaces is typically selected to be one or two meters, however, the spacing may be varied depending upon the available seismic information, and other factors, such as sedimentary heterogeneity, sampling constraints, or the frequency content of the seismic data. These additional surfaces may also be defined by Chebyshev polynomials, and the coefficients of the polynomials which define the interpolated surfaces may be established by any suitable method of parameter estimation, such as linear interpolation. FIG. 5 illustrates, in a two dimensional plane, the additional interpolated surfaces.

The surfaces constructed in steps 38 and 40 will define the upper and lower boundaries of subsurface strata, which will be referred to herein as "layers". For purposes of the constructed model, the properties of interest within each layer are assumed to be homogeneous in the z direction. In step 42 of FIG. 2, the property of interest extending across region 14 within each layer, such as velocity or slowness, is represented by at least one continuous analytic function. For this purpose, a second set of continuous analytic functions, such as a series of Chebyshev polynomials, may be used to define the property of interest within each layer. An initial profile for the property of interest will be assumed for the layer between each pair of vertically adjacent surfaces. For purposes of describing a preferred embodiment, the property of interest will be assumed to be pressure wave (P-wave) slowness, the reciprocal of velocity, although the model may be used to generate a map of other properties of interest, such as shear wave velocity, attenuation or anisotropy. Accordingly, the slowness field $S(x,y)$ may be represented for each layer with a third-order Chebyshev polynomial in the form:

$$S(x,y) = C_0 + C_1 x + C_2 y + C_3 xy + C_4(2x^2-1) + C_5(2y^2-1) + C_6(2x^2-1)y +$$
$$C_7(2y^2-1)x + C_8(4x^3-3x) + C_9(4y^3-3y) \quad \text{(Eq. 2)}$$

where $C_0$–$C_9$ are the ten Chebyshev coefficients. Slowness values from a priori information, such as well logs or VSP data, may be utilized to make an initial estimate of the slowness profile within each layer. However, for implementations of the invention in which smoothing constraints are utilized, as further discussed herein, a constant value may be utilized for the initial slowness value, which may be based on the average of the travel time of the seismic signal between the source and receiver locations divided by the distance between source and receiver locations of the recorded data traces.

Figure 6:
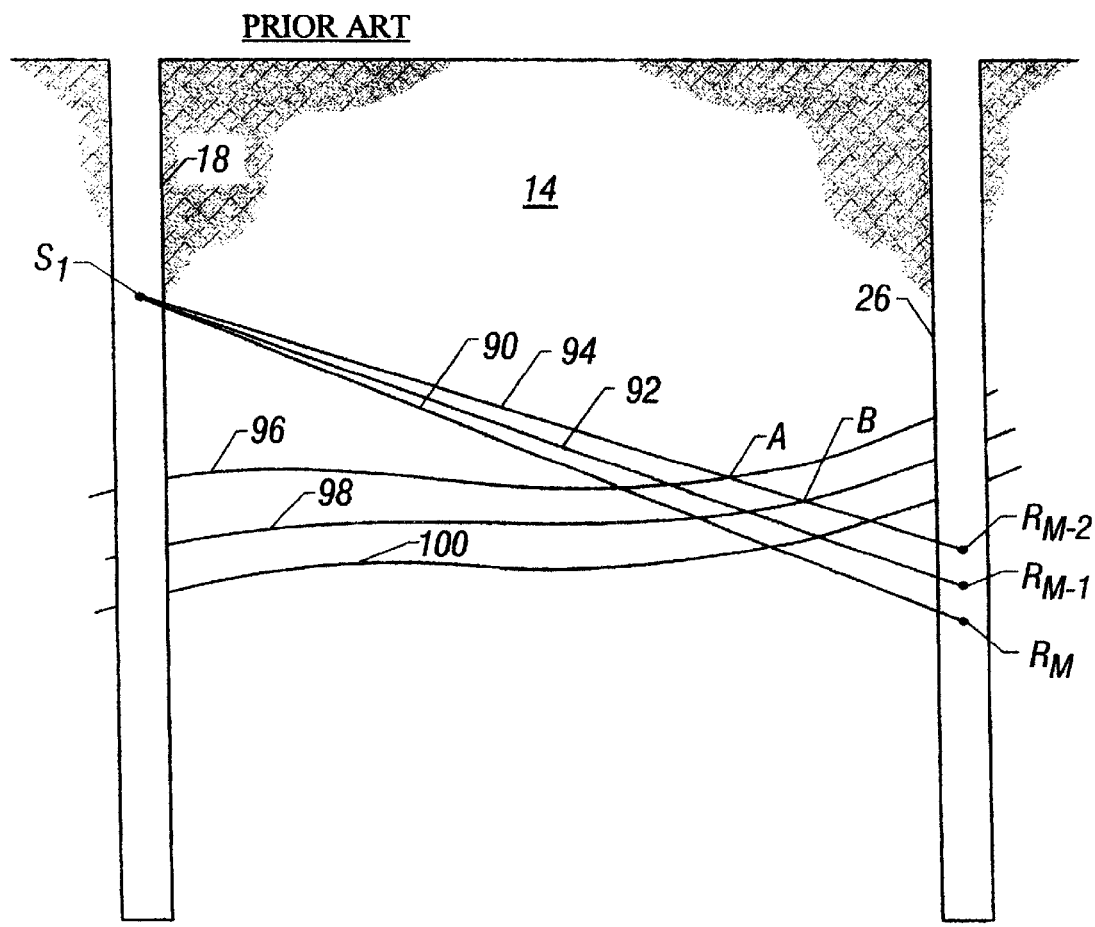
FIG. 6 shows the initial construction of raypaths through a subsurface model

With reference to FIG. 6, the travel time (T) for the straight ray segment between points A and B on adjacent surfaces can be written:

$$T = \int_A^B S(x,y) dl \quad \text{(Eq. 3)}$$

where dl is an incremental step along the path between points A and B. For the straight segments between surfaces, this integral is readily calculated by performing parametric integration. In a preferred embodiment, slowness has been chosen for representation using Chebyshev polynomials rather than velocity since integration of slowness along a raypath gives the travel time of that path. Representation of the slowness field as Chebyshev polynomials enables calculation of all of the partial derivatives required for forward modeling and for tomographic inversion in closed form. The Chebyshev polynomials used to represent the surfaces and the property of interest within the layers may be third order 2-D polynomials.

It should be noted that, as shown in Eq. 1 and Eq. 2, the Chebyshev polynomials are characterized using only ten coefficients. High spatial resolutions are provided with far fewer model parameters than are seen in typical pixelized models. The ten coefficients can be grouped into four third-order terms ($C_6$, $C_7$, $C_8$ and $C_9$), three second-order terms ($C_3$, $C_4$ and $C_5$), two order terms ($C_1$ and $C_2$) and a constant term $C_0$. The weighted distribution of the coefficients in the Chebyshev polynomials is advantageous as a direct means of controlling the shape of the surfaces defined by the functions. The higher order terms (the quadratic and cubic terms involving second and third powers in x and y) may be weighted to control the degree of curvature in the surfaces (i.e., the variation from a planar surface). The weighting formulation which is used for the polynomials in a particular geologic setting can be determined based on a priori information such as, for example, the curvature suggested by the formation tops.

If data are not available from which geological formation boundaries may be inferred, the surfaces may be constructed as planes, which may extend horizontally, or in other selected configurations.

After the surfaces are constructed by use of a first set of Chebyshev polynomials and the profile of slowness within the layers between the surfaces is constructed by use of a second set of Chebyshev polynomials, the travel time through the layers from a seismic source location to a seismic receiver location may be computed.

Figure 7:
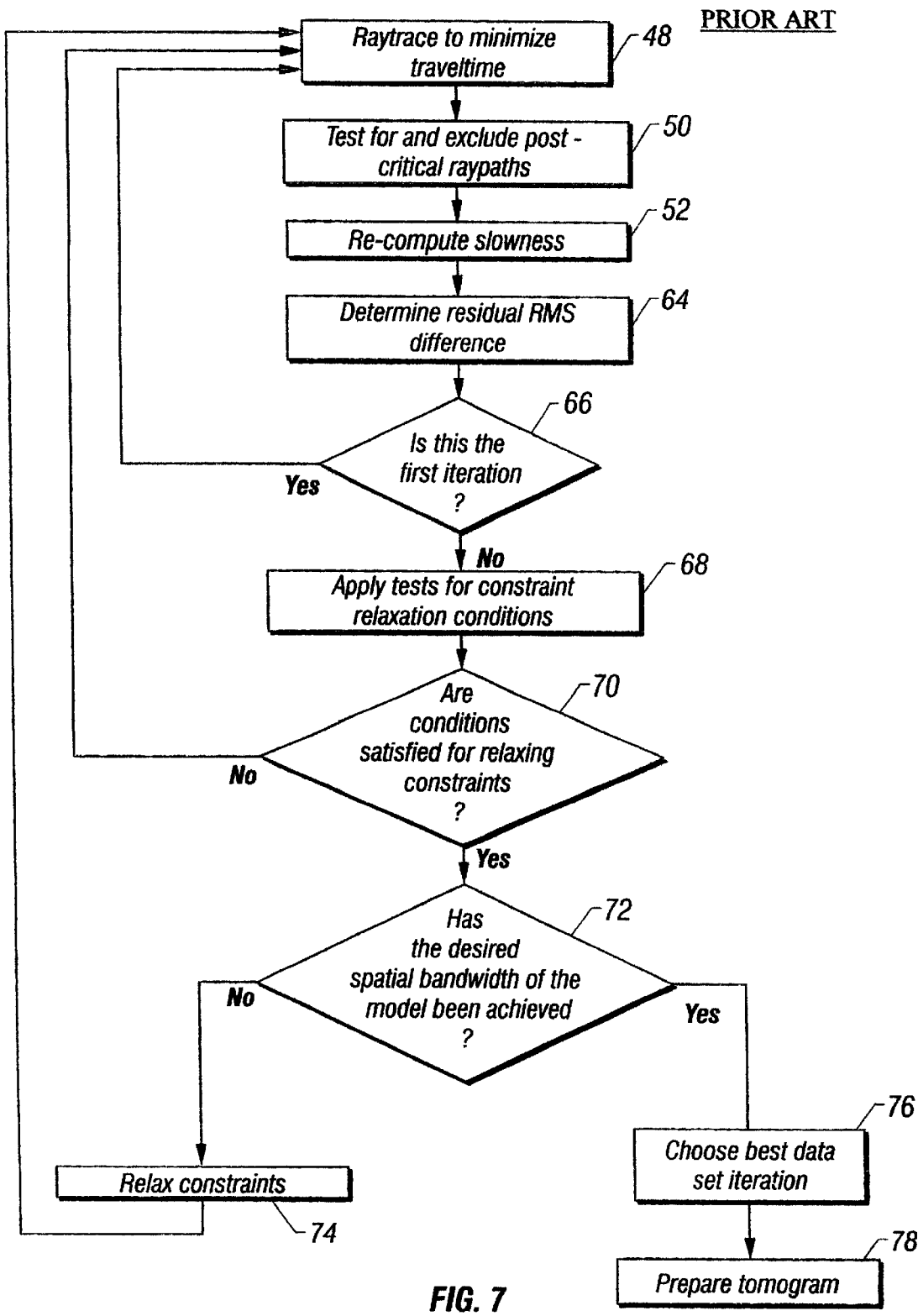
FIG. 7 shows additional steps useful in an implementation of the invention.

In one implementation of the invention, the procedure outlined in FIG. 7 is performed to prepare a tomogram by application of the data set recorded as illustrated in FIG. 1 to the model developed as outlined in FIG. 2.

Figure 9:
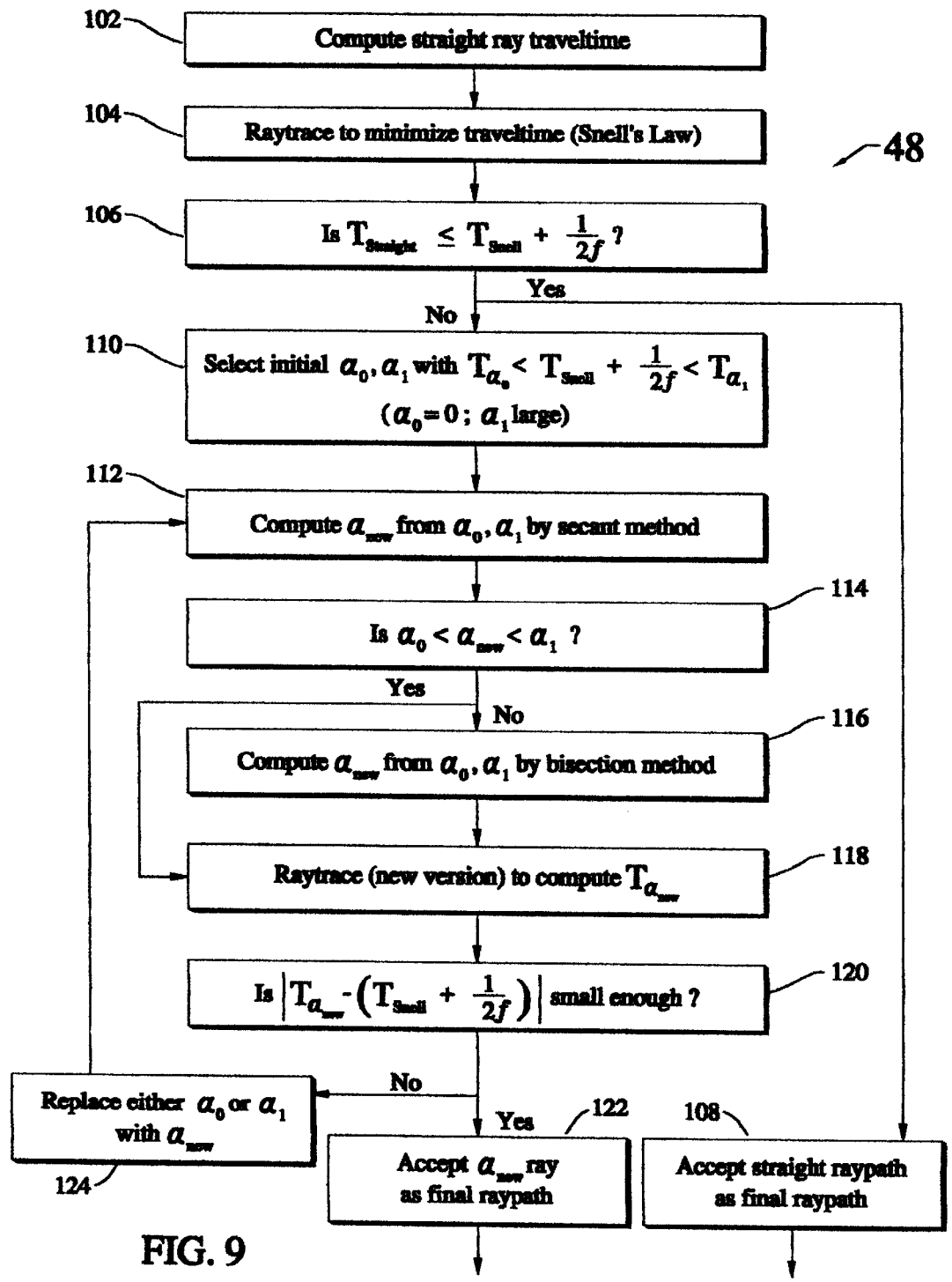
FIG. 9 shows further steps useful in an implementation of the invention

In step 48 of FIG. 7, propagation paths and travel times are computed. Step 48 is depicted in greater detail in FIG. 9. Referring to FIG. 9, in step 102, raypaths are constructed which extend in a straight line from each source position to each receiver position. FIG. 6 shows the construction of these straight raypaths, but for clarity, only raypaths 90, 92 and 94 are shown, extending only from one source position S1 to three receiver positions, $R_M$, $R_{M-1}$, and $R_{M-2}$. The intersection of each raypath with each formation surface is identified. FIG. 6 shows the intersection points of raypaths 90, 92, and 94 with formation surfaces 96, 98 and 100. Only three surfaces are shown for clarity.

Both the travel time along the straight raypaths and the Snell's Law travel time are utilized in performing an embodiment of the invention. Snell's Law is a well known principle of signal propagation. According to Snell's Law, $$\frac{\sin\Theta_1}{V_1} = \frac{\sin\Theta_2}{V_2} \quad \text{(Eq. 4)}$$

where $V_1$ is the velocity of the subsurface on the incident side of the subsurface interface and $V_2$ is the velocity of the subsurface on the refraction side of the interface. The angle $\Theta_1$ is the angle of the raypath with respect to a "normal" extending perpendicularly through the interface surface on the incident side of the interface, and $\Theta_2$ is the angle of the raypath with respect to the normal on the refraction side of the interface. Ray bending (described below) is performed to minimize the travel time, according to Fermat's principle, in order to calculate the Snell's Law travel time and travel path. Although the "bending method" does not rely explicitly on Snell's Law in solving for the raypath, the raypath that minimizes the travel time does satisfy Snell's Law and is called the Snell's Law raypath.

In step 104, Snell's Law travel time is computed by performing raytracing through the model to minimize travel time for each raypath. In a preferred embodiment of the invention, the "bending" method is used to perform raytracing through a three dimensional model. The "bending method" is a perturbative approach that relies on Fermat's principle of least time. According to Fermat's principle, the ray with the minimum travel time arrives first. Thus to compute first arrivals, travel time for each raypath is minimized by determining the partial derivatives in closed form of travel time of the raypath with respect to the intersection locations of the raypath with the surfaces and utilizing the derivatives to direct a minimization process, which may be Newton's method. Due to the vertical stratification of the model, z on the surfaces is a function of x and y, and only updates to x and y at the intersections of the raypaths with the surfaces need to be solved for. Raypaths are assumed to be straight lines between surface boundaries. In performing this step, the slowness in each layer is not altered. For each raypath, the x and y intersections for the n layers the raypath passes through are organized into a vector, X, of length 2n:

$$X=(x_1, y_1, x_2, y_2, \ldots, x_n, y_n) \quad \text{(Eq. 5)}$$

The vector of first partial derivatives of travel time with respect to these positions is then $\delta T/\delta X_i$, and the matrix of second partial derivatives is $\delta^2 T/\delta X_i \delta X_j$ where T is travel time. With this notation, the application of Newton's algorithm can be written:

$$\frac{\delta^2 T}{\delta X_i \delta X_j} \Delta X_j = \frac{-\delta T}{\delta X_i} \quad \text{(Eq. 6)}$$

where T is travel time, X is a vector containing the locations of the surface intersections, and $\Delta X$ is a vector of perturbations to the intersection locations designed to minimize travel time, so as to define a system of equations. The solution $\Delta X$ of this linear system of equations is added to the current estimate for the vector X of surface intersections to generate a new estimate for the vector X. Travel time is minimized by iterating this procedure of setting up and solving Eq. 6 and updating the vector X. Both the first and second partial derivatives of travel time with respect to the elements of X are calculated. Due to the form of this equation, only contributions from ray segments in adjacent layers remain in the partial derivatives. Any second derivative with respect to elements of X more than 3 indices apart is zero. The Hessian matrix of second derivatives of travel time is therefore symmetric and band-diagonal, with non-zero elements in only three super-diagonals. The form of the Hessian matrix is shown in FIG. 8. For derivatives with respect to the intersection of the raypath with the i'th surface, only the seven elements within the two middle rows need to be calculated. Accordingly, the derivative of travel time with respect to the intersection location for each surface intersection is calculated and the point of intersection of each raypath with each surface is changed so that the travel time along each raypath between the source locations and the receiver locations is minimized.

Figure 10:
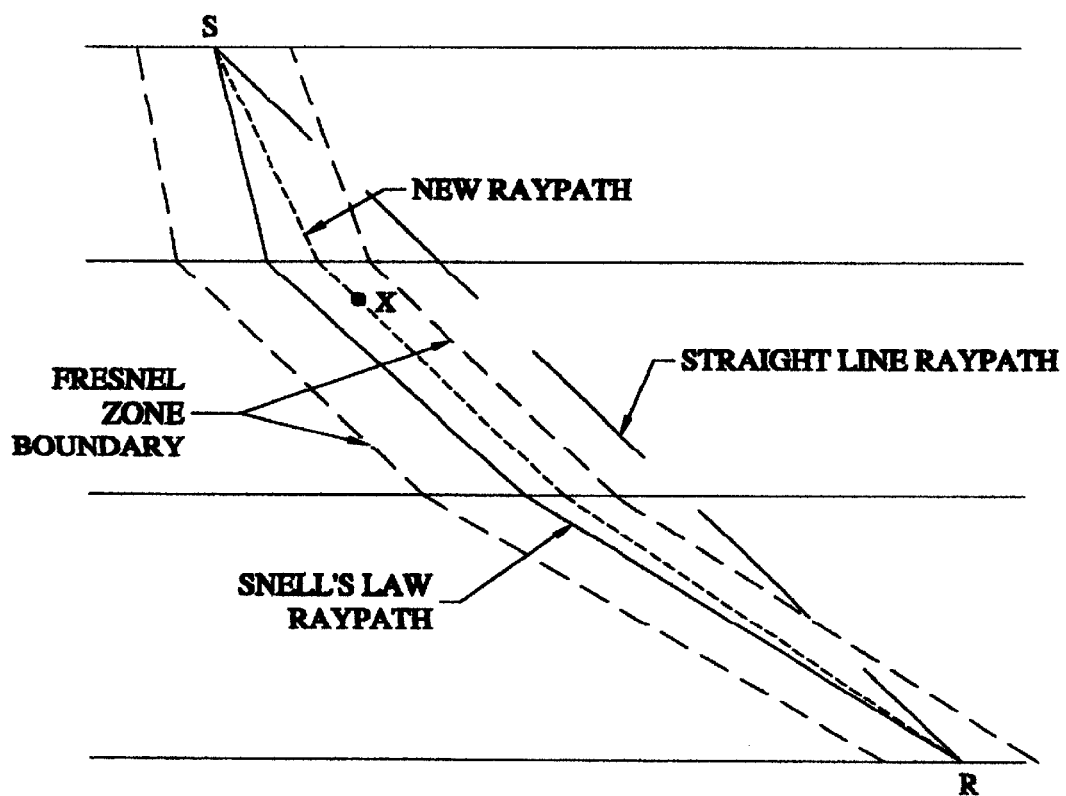
FIG. 10 is an illustration of the First Fresnel Zone.

Although it is well known that very high frequency signals tend to propagate along Snell's Law raypaths, it has long been recognized by geophysicists that seismic energy propagates not just along these raypaths, but also within a zone around the Snell's Law raypath. When there is sharp bending in the Snell's Law raypath due to larger velocity contrasts between adjacent subsurface layers, it is not uncommon for only a small amount of energy to travel along the Snell's Law raypath, with much more energy traveling along more direct paths from the source location to the receiver location, and arriving at the receiver location at a later time than the energy traveling along the Snell's Law raypath. This happens frequently in crosswell seismic imaging. Real seismic signals are band limited. When a signal from a source location, S, to a receiver location, R, has most of its energy near a finite (temporal) frequency f, the zone in which much of the energy travels that will influence what appears to be the first arrival of energy at the receiver is called the First Fresnel Zone. All energy arriving at the receiver location with no more delay than a half period from the energy traveling along the Snell's Law raypath travels within the First Fresnel Zone and will influence what appears to be the first arrival of energy at the receiver. With reference to FIG. 10, a point X is on the First Fresnel Zone boundary when $$T_{SX}+T_{XR}=T_{Snell}+1/(2f), \quad \text{(Eq. 7a)}$$

and, accordingly, a point X is in the First Fresnel Zone for the Snell's Law raypath from S (the source location) to R (the receiver location) if:

$$T_{SX}+T_{XR} \leq T_{Snell}+1/(2f) \quad \text{(Eq. 7b)}$$

where: $T_{Snell}$ is the travel time along the Snell's Law raypath from S to R, $T_{SX}$ is the travel time along the Snell's Law raypath from S to X, and $T_{XR}$ is the travel time along the Snell's Law raypath from X to R.

FIG. 10 illustrates (in two dimensions) the boundary of the First Fresnel Zone surrounding a typical seismic signal transmission path estimated by use of the Snell's Law calculations.

In accordance with a preferred embodiment of the invention, a raypath is estimated which more closely approximates the raypath along which seismic energy travels from source location to receiver location than the Snell's Law raypath. It has been observed empirically that improved results are obtained in the preferred embodiment if the propagation path is taken to be the most direct path (as further defined below) between the source and the receiver that stays within the First Fresnel Zone. With reference to FIG. 9, step 106, if a straight line raypath is within the First Fresnel Zone, the straight line raypath is accepted as the raypath. If a straight line raypath is not within the First Fresnel Zone, the most direct path is deemed to be a raypath that minimizes a function of time and distance, and which remains within the First Fresnel Zone. In a preferred implementation of the invention, the following function of time and distance is minimized:

$$\sum_i \frac{t_i}{T_0} + \frac{\alpha}{2} \sum_i \left(\frac{r_i}{R_0}\right)^2 \quad \text{(Eq. 8)}$$

in which $t_i$=the computed travel time across the i'th subsurface layer;

$T_0$=the total Snell's Law travel time;

$r_i$=the computed distance of the travel path in the i'th subsurface layer;

$R_0$=the total Snell's Law distance; and $\alpha$ is a dimensionless quantity which balances the weighting of travel time and distance in said expression.

The method used to solve this minimization problem is a modification of the Newton's-algorithm method for finding the Snell's Law raypath using Fermat's principle. The derivatives of the second term in Eq. 8 with respect to the locations of the surface intersections are also computed exactly, and the sparse structure of the Hessian matrix is the same as in FIG. 8 for the Snell's Law computation. The second term in Eq. 8 acts as a regularizing term. It has been observed empirically that this minimization problem is better conditioned than, and can be solved faster than, the Fermat's principle minimization problem used to compute the Snell's Law raypath.

Minimizing the expression of Eq. 8 achieves a tradeoff between minimizing time and minimizing distance. Variations of Eq. 8 will, however, achieve similar results. For example the value of the straight line travel time may be used for $T_0$, rather than the Snell's Law travel time.

In one embodiment of the invention, the expression of Eq. 8 is minimized for varying values of $\alpha$, until a value of $\alpha$ is obtained for which the travel time $$T_\alpha = \sum_i t_i,$$

approximately satisfies:

$$T_\alpha = T_{Snell} + \frac{1}{2f}, \quad \text{(Eq. 9)}$$

where $T_\alpha$=the travel time resulting from a minimization of the expression of Eq. 8 for a value of $\alpha$;

$T_{Snell}$=the Snell's Law travel time; and f=the dominant frequency of the seismic signal.

The raypath for this value of a is the most direct raypath, in the sense of making $$\frac{1}{2}\sum_i \left(\frac{r_i}{R_0}\right)^2$$

as small as possible, which is still in the First Fresnel Zone.

A method which may be used to determine a value of $\alpha$ for which the travel time $T_\alpha$ approximately satisfies Eq. 9 is an iterative process called the bisection-guarded secant method, a combination of two methods, well known to those of ordinary skill in the art, for solving nonlinear equations in one unknown. There are a number of variants of the bisection guarded-secant method. The variant described below is the simplest variant, but other variants may be used. Each iteration starts with two values of $\alpha$, designated as $\alpha_0$ and $\alpha_1$, for which $$T_{\alpha_0} < \left(T_{Snell} + \frac{1}{2f}\right) < T_{\alpha_1}. \quad \text{(Eq. 10)}$$

This ensures that the value of $\alpha$ which provides the solution of Eq. 9 is between $\alpha_0$ and $\alpha_1$. With reference to FIG. 9, step 110, the initial selected value of $\alpha_0$ may be zero (0) and the initial selected value of $\alpha_1$ may be an arbitrarily large number (100, for example). In step 112, in each iteration, a value $\alpha_{new}$ for $\alpha$ is computed from the values of $\alpha_0$ and $\alpha_1$ using one step of the secant method. In step 114, if the value of $\alpha_{new}$ is greater than the value of $\alpha_0$, but less than the value of $\alpha_1$, the value of $\alpha_{new}$ determined by the secant method is then used in the current iteration. If $\alpha_{new}$ is not within the range $$\alpha_0 < \alpha_{new} < \alpha_1,$$

then, in step 116, a value is computed for $\alpha_{new}$ by the bisection method, as follows:

$$\alpha_{new} = \frac{\alpha_0 + \alpha_1}{2}. \quad \text{(Eq. 11)}$$

The new value $\alpha_{new}$ is then utilized as a new value of $\alpha$ in the expression of Eq. 8, and ray bending is performed in step 118 to determine the travel path which minimizes the expression of Eq. 8, and the calculated travel time, $T_\alpha$ is compared in step 120 to $T_{Snell}+1/(2f)$ If the calculated travel time is sufficiently close to $T_{Snell}+1/(2f)$ the calculated raypath for that value of a is accepted as the raypath from S (the source location) to R (the receiver location) and $T_\alpha$ is accepted, in step 122, as the travel time from S to R.

If the calculated travel time is not acceptably close to $T_{Snell}+1/(2f)$, the value of either $\alpha_0$ or $\alpha_1$ is replaced, in step 124, with the value of $\alpha_{new}$ and steps 112, 114, 118 and 120 (and step 116, if required) are repeated. If the value of $T_{\alpha_{new}}$ is greater than $T_{Snell}+1/(2f)$, the value of $\alpha_{new}$ replaces the value of $\alpha_1$. If $T_{\alpha_{new}}$ is less than $T_{Snell}+1/(2f)$, the value of $\alpha_0$ is replaced with the value of $\alpha_{new}$. Steps 112, 114, 118 and 120 (and 116, if required) are repeated until the newly calculated value of $T_{\alpha_{new}}$ is acceptably close to $T_{Snell}+1/(2f)$.

In another embodiment of the invention, a number of simplifying assumptions are utilized and a rough estimate of the value of $\alpha$ is calculated for which the travel time $T_\alpha$ approximately satisfies Eq. 9. This value of a is calculated as follows:

$$\alpha = \frac{1}{\sigma}\frac{z_{offset}}{x_{offset}}\frac{1}{(fT_0)^{\frac{1}{2}}} \quad \text{(Eq. 12)}$$

where: f=the dominant frequency in the seismic signal;

$Z_{offset}$=the vertical offset from source location to receiver location;

$X_{offset}$=the horizontal offset from source location to receiver location;

$T_0$=an estimate of the total travel time (Note: substantially equivalent results are achieved regardless of whether the Snell's Law travel time is utilized or the straight ray travel time);

$$\sigma = \frac{\Delta x_{std}}{\Delta x_{av}}, \text{ where}$$

$\Delta x_{av}$=the average of the horizontal increments in the segments making up the Snell's Law ray; and $\Delta x_{std}$=the standard deviation of the horizontal increments in the segments making up the Snell's Law ray.

The expression of Eq. 8 is then minimized for the calculated value of $\alpha$, and after minimizing the expression in Eq. 8 for the calculated value of $\alpha$, $$T_\alpha = \sum_i t_i \quad \text{(Eq. 13)}$$

is set to be the travel time along the raypath computed for that value of $\alpha$.

Referring again to FIG. 7, following completion of step 48, a system of equations is established in step 52 in the following form for deriving an improved calculation of the slowness in each layer, utilizing the raypaths retained following step 48 and a travel time for each raypath determined from the "picked" first arrival for that raypath.

$$Adp=dT \quad \text{(Eq. 14)}$$

in which A is the matrix of derivatives of travel time with respect to the model parameters (the coefficients of the Chebyshev polynomials describing slowness), dp is the vector of updates to the current model parameters (changes in the actual coefficients of the Chebyshev polynomials describing slowness), and dT is the vector of travel time residuals (the "picked" travel times minus the travel times computed from the model in the forward modeling step). In a preferred implementation of the invention, constraints are added to the system of equations shown in Eq. 14 to limit the abruptness with which slowness is permitted to change within a layer or between layers. Horizontal penalty and vertical penalty constraint terms are added by appending rows to the derivative matrix A on the left hand side of the system of equations and appending corresponding terms to the right hand side of the system of equations. The appended rows in the matrix on the left hand side and the appended entries on the right hand side are multiplied by scalars $C_h$ and $C_v$, which are scale factors for the horizontal and vertical constraint terms, respectively. These constraints are then relaxed in a sequence of steps, reducing $C_h$ and $C_v$ in each step. In step 68, two tests are applied at each level of constraints to determine whether to proceed to a lower constraint level.

The slowness of the layers recalculated in step 52 with the foregoing procedure will normally result in some residual difference between the calculated travel time for each raypath which is calculated from the newly computed slowness within each layer, and the "picked" travel times which are determined from the detected first arrivals for the same raypaths. In step 64 the residual root mean square (RMS) value of the right hand side of the system of equations, which includes the differences between the travel times calculated from the model and picked travel times as well as the constraint terms involving horizontal and vertical penalties is determined. As indicated in step 66 of FIG. 7, following the first computation of this RMS value, steps 48, 52, and 64 are repeated, and following the second iteration and later iterations, after the decision in step 66, the procedure goes to step 68, in which two tests are applied to determine if conditions have been achieved for relaxing the constraints. In the first test, a comparison is made between the new residual RMS value and the previous residual RMS value. If the difference between the old residual RMS value and the new residual RMS value is less than a selected magnitude, then the test is satisfied. For example, the test may be satisfied if the old residual RMS value ($resid_{old}$) minus the new residual RMS value ($resid_{new}$) is less than 0.5 percent of the old residual RMS value, which may be written:

$$(resid_{old} - resid_{new}) < (0.005)(resid_{old}) \quad \text{(Eq. 15)}$$

Like the first test, the second test is also concerned with how well the model parameters minimize the combined travel time and constraint residual RMS value, for the current values of the constraint scale factors $C_h$ and $C_v$. For purposes of the following discussion Eq. 14 will be rewritten as:

$$A'dp = dT' \quad \text{(Eq. 16)}$$

where A' includes the derivative matrix A and horizontal and vertical constraint terms, and dT' includes the vector of travel time residuals (the "picked" travel times minus the travel times computed in the forward modeling step from the model) and horizontal and vertical constraint terms. In addition, the quantities $|A'dp|$, the "norm" of the matrix-vector product A' times dp, and $|dT'|$, the "norm" of the right-hand side combined (travel time and constraint) residual vector dT', are utilized. The second stopping condition requires that the ratio $$\frac{|A'dp|}{|dT'|}$$

be less than some tolerance $N_{tol}$ (for example, 0.1). The idea here is that when this ratio is small, only a small fraction of the remaining combined residual vector dT' is being matched by A'dp, and therefore further passes through the loop comprising steps 48, 52, 64, 66, 68, and 70 are not likely to give any further substantial decrease in the residual RMS value for the current values of the constraint scale factors $C_h$ and $C_v$. The second stopping condition is expressed as:

$$\frac{|A'dp|}{|dT'|} < N_{tol} \quad \text{(Eq. 17)}$$

where $N_{tol}$ is, for example, 0.1.

When both tests applied in step 68 are satisfied, a decision is made in step 70 to proceed to the next continuation step. The next "continuation step" decreases the constraints, thereby reducing smoothness to continue the inversion process outlined above. In step 72, a decision is made as to whether the relaxation of the constraints applied to the inversion process of step 52 has achieved the desired spatial bandwidth of the model. Typically, about five successive levels of constraint relaxation will be utilized. If the desired spatial bandwidth has not been achieved, the process proceeds to step 74, where the constraints are relaxed and then the process reverts back to step 48. It should be noted that the overall process comprises a loop within a loop, with the inner loop comprising steps 48, 52, 64 and 66 for the first iteration and steps 48, 52, 64, 66, 68 and 70 for subsequent iterations, and the outer loop comprising steps 48, 52, 64, 66, 68, 70, 72 and 74. After the constraint relaxation has achieved the desired spatial bandwidth, the best data set (typically the data set for which the RMS value of the difference between the calculated travel times and the detected travel times is lowest) is then selected in step 76 and a tomogram, or map, of the subsurface property of interest may then be prepared from the data set in step 78.

If the coefficients in the Chebyshev polynomials used to model the subterranean region of interest are not constrained, the magnitude of the property of interest (for example, slowness) can become unrealistic at locations away from the boreholes. For example, such magnitudes might take on values which are clearly geologically implausible, such as infinity. In order to avoid such an implausible model and to provide for an essentially "automated" process, continuation constraints may be utilized in implementing the present invention. The continuation constraint approach is configured for first resolving long-wavelength features, and thereafter contributions from higher wavenumber features are included. In this manner, spatial resolution and variability in the model is successively increased. The initial "low frequency" part of the model is recovered by forcing model variability to be small (forcing the model to be smooth) in the early stages of the inversion process. The subject of such constraints is well known to those of ordinary skill in the art, and the discussion of constraints herein is by way of example and not of limitation.

A preferred embodiment of the method for estimating propagation paths of a seismic signal from seismic source locations to seismic receiver locations has been described in terms of crosswell seismic imaging. Although the preferred embodiment is described with reference to signals generated in a first borehole and detected by receivers in a second borehole, those of ordinary skill in the art will recognize that the invention may be practiced by generating and detecting seismic signals with sources and receivers which are in the same borehole. Further, those of ordinary skill in the art will recognize that this method of estimating propagation paths is equally applicable in any process which requires estimation of travel paths and travel time of seismic energy, such as surface seismic data and vertical seismic profiting data. Those of ordinary skill in the art will recognize, also, that this method of estimating propagation paths is equally applicable in any process which requires estimation of travel paths and travel time of seismic energy that is reflected from subsurface heterogeneities, such as surface seismic reflection imaging, vertical seismic profiling reflection imaging and crosswell reflection imaging.

The invention has been described with a certain degree of particularity, however, many changes may be made in the details without departing from the scope of the invention. It is understood that the invention is not limited to the embodiments set forth herein, but is to be limited only to the scope of the attached claims, including the full range of equivalency to which each element thereof is entitled.

We claim:

1. A method for estimating propagation raypaths for seismic signals from seismic source locations through a subsurface formation to seismic receiver locations, comprising:

determining raypaths for said seismic signals which minimize the value of an expression which is a function of travel time and distance between a source location and a receiver location, where the value of said expression depends on the value of a parameter which balances the weighting of travel time and distance in said expression.

2. The method of claim 1 wherein said seismic source locations and said seismic receiver locations are substantially at the earth's surface.

3. The method of claim 1 wherein said seismic source locations and said seismic receiver locations are in boreholes.

4. The method of claim 1 wherein said seismic source locations are substantially at the earth's surface and said seismic receiver locations are in a borehole.

5. The method of claim 1 wherein said seismic source locations are in a borehole and said seismic receiver locations are substantially at the earth's surface.

6. The method of claim 1 wherein said expression comprises:

$$\sum_i \frac{t_i}{T_0} + \frac{\alpha}{2} \sum_i \left(\frac{r_i}{R_0}\right)^2.$$

wherein:

$\alpha$ is said parameter which balances the weighting of travel time an distance;

$t_i$=computed travel time across an i'th subsurface layer of said subsurface formation;

$T_0$=total Snell's Law travel time;

$r_i$=computed distance of the travel path in the i'th subsurface layer of said subsurface formation; and $R_0$=total Snell's Law distance.

7. The method of claim 6 further comprising:

estimating, for a dominant frequency f of said seismic signals, a value for said parameter $\alpha$, which estimated value results in a raypath from said seismic source location to said seismic receiver location along which travel time is approximately equal to $T_{Snell}+1/(2f)$, when the value of said expression is minimized, wherein $T_{Snell}$=Snell's Law travel time.

8. The method of claim 7 further comprising determining a raypath which minimizes the value of said expression with the value of said parameter $\alpha$ set to said estimated value.

9. The method of claim 1 wherein the following expression is used to estimate a value of said parameter:

$$\alpha = \frac{1}{\sigma} \frac{z_{offset}}{x_{offset}} \frac{1}{(fT_0)^{\frac{1}{2}}}$$

wherein: $\alpha$ is said parameter;

f=dominant frequency in the seismic signals;

$z_{offset}$=vertical offset from source location to receiver location;

$x_{offset}$=horizontal offset from source location to receiver location;

$T_0$=total Snell's Law travel time; and $$\sigma = \frac{\Delta x_{std}}{\Delta x_{av}}, \text{ where}$$

$\Delta x_{av}$=the average of the horizontal increments in the segments making up the Snell's Law ray; and $\Delta x_{std}$=the standard deviation of the horizontal increments in the segments making up the Snell's Law ray.

10. The method of claim 1 wherein estimating a value for said parameter comprises:

selecting a preliminary value for said parameter determining a raypath that minimizes the value of said expression, and modifying the value of said parameter and repeating said determining a raypath that minimized the value of said expression until a raypath is defined having a travel time approximately equal to $T_{Snell}+1/(2f)$ when the value of said expression is minimized, wherein $T_{Snell}$=Snell's Law travel time f=the dominant frequency in the seismic signals.

* * * * *